United States Patent Office 2,971,984
Patented Feb. 14, 1961

2,971,984

PROCESS FOR PREPARING BUTYRALDEHYDE

Otto Horn, Frankfurt am Main, Germany, assignor to Farbwerke Hoechst Aktiengesellschaft vormals Meister Lucius & Bruning, Frankfurt am Main, Germany, a corporation of Germany No Drawing. Filed July 16, 1957, Ser. No. 672,111

4 Claims. (Cl. 260—601)

The present invention relates to a process for preparing butyraldehyde.

It is known to prepare butyraldehyde by partial, catalytic hydrogenation of crotonaldehyde. In practice, this hydrogenation of crotonaldehyde with hydrogen resulting in the formation of butyraldehyde was effected either in the liquid phase with application of nickel catalysts or in the gaseous phase with application of copper catalysts that had lost their maximum activity in the preceding preparation of butanol. In both cases it was, however, not possible to obtain pure butyraldehyde for inavoidably butanol formed which during the separation by distillation combined with butyraldehyde to form acetal and thus diminished the yield of butyraldehyde. It has therefore been proposed to use catalysts of noble metals. Besides this, butanol has been used as a solvent or diluent. For the reasons given above this is, however, undesirable.

According to a known method organic compounds such as crotonaldehyde or acetaldehyde are hydrogenated in the gaeous phase in the presence of activated copper catalysts. In this case the compounds are generally reduced to the corresponding alcohol. In some cases a comparatively great amount of butyraldehyde is formed. But even then about one sixth of the butyraldehyde that has formed is further hydrogenated and thus converted into butanol.

There is furthermore known a process for hydrogenating crotonaldehyde in the gaseous phase, wherein nickel catalysts are treated at an elevated temperature with an excess amount of hydrogen and thus a product is obtained which consists of one third of butanol and of two thirds of butyraldehyde.

In practice it is much more difficult to treat substances in the liquid phase and under pressure than to treat them in the gaseous phase. The treatment of substances in the liquid state and under pressure particularly involves the disadvantage that possible disturbances are much more liable to occur than in processes that can be carried out without application of pressure. Even in the known processes for hydrogenating crotonaldehyde in the liquid phase there is always produced a certain portion of high-boiling condensation products. When hydrogenation is carried out while stirring well there are still obtained about 7% of high-boiling condensation products (see the pertinent literature). In another case described in German patent 539,177 it has been proposed to use a catalyst which had been prepared by heating a nickel salt solution together with silicon-oxygen compounds such as oxydisiline. Such catalysts are, however, insufficiently reproducible. It can moreover be gathered from the patent concerned that between about 5% and 10% of by-products are formed. According to another known process which is also carried out in the liquid phase with the use of a nickel skeleton catalyst, there are likewise formed about 5% of by-products. When used in said process the catalyst is exhausted within about 3 weeks. Finally a process has been described wherein the hydrogenation of crotonaldehyde resulting in its transformation into butyraldehyde is carried out in the liquid phase under hydrogen pressure and with the use of platinum-palladium catalysts. In this process, too, about 5% of condensation products are formed.

It is furthermore known to produce butyraldehyde in the gaseous phase with no formation of butanol taking place, by using nickel oxide deposited on carriers and partially reduced to metallic nickel at a temperature between 160 and 250° C., advantageously between 180 and 200° C., as a catalyst for the hydrogenation of crotonaldehyde.

Now I have found that catalysts of nickel oxides on a suitable support, i.e. a mixture of NiO and $Ni_2O_3$ on a suitable carrier material, which after having been applied onto the support is mixed with 0.5 to 5% of copper sulfate, calculated upon nickel oxides and carrier, and then subjected to a partial reduction at a temperature of 160 to 250° C. preferably 180–200° C., are especially suitable for the hydrogenation of crotonaldehyde in the gaseous phase yielding butyraldehyde without any formation of butanol as an undesired reduction product taking place. The catalyst system according to the present invention accordingly consists of nickel oxide on an appropriate carrier material and of metallic nickel and copper sulfate, the proportion by weight of nickel oxide (NiO) to metallic nickel advantageously ranging from 10:1 to 10:2. The nickel oxides may also be applied to the carrier material in the form of an aqueous suspension.

The hydrogenation of crotonaldehyde resulting in its transformation into butyraldehyde can be carried out at the same temperature as that at which the partial reduction of the catalyst according to this invention has been effected. The catalyst is advantageously fed in a molar ratio of crotonaldehyde to hydrogen of, for example, 1:1. It is of particular advantage to use hydrogen which has been diluted by means of inert gases such as nitrogen, methane or other hydrocarbons but it is also possible to use pure hydrogen. As materials suitable for carrying the catalyst there may be mentioned pumice grains, ceramic materials, kieselguhr, silica gel, pumice powder, and other products appropriate for this purpose. The nickel oxides may be commercial products obtained by roasting nickel salts or according to other methods, for example, by oxidation of metallic nickel. Nickel compounds may also be deposited on the carrier material by precipitating them from soluble salts, for example, by means of carbonates such as sodium carbonate or potassium carbonate or by means of hydroxides such as sodium hydroxide or potassium hydroxide or by means of appropriate quantities of ammonia, and by subsequently washing said nickel compounds with water and by then converting them into nickel oxides by roasting them in a gas current containing oxygen. The reduction temperature and operating temperature may be further reduced by addition of a small amount of copper oxide.

When using the catalysts of the present invention a great yield of butyraldehyde is obtained per unit of weight of catalysts and 94 to 95% of the crotonaldehyde used are converted into butyraldehyde. Furthermore, the catalysts according to the invention are distinguished by longevity. They may be in continuous operation for more than a year before it will be necessary to subject them to a regeneration. They are moreover extremely insensitive to load variations which is, for example, shown by the fact that after an interruption of operation that has taken place for one reason or the other they may again be used without exhibiting any loss in efficiency.

By means of such catalysts it is possible when using 90% of crotonaldehyde (the rest being water) and the theoretically required amount of hydrogen to obtain a very good yield of butyraldehyde produced besides unchanged crotonaldehyde. The quantity of byproducts amounts to less than 1%. The separation of butyraldehyde is brought about in a very simple way by distillation and the portion of not converted crotonaldehyde may be used again. Since, owing to the absence of butanol, no formation of acetal is possible and since practically no other high-boiling condensation products are formed, the total quantity of the butyraldehyde contained in the reaction mixture can be isolated in a pure form.

In the catalytic hydrogenation there may be used with special advantage pumice catalysts which are obtained by reduction of a pumice carrier containing 15% by weight of nickel oxides, 2% by weight of cupric ions and 3% by weight of sulfate ions, the percentages being calculated upon the total system, i.e. carrier and material added, and the reduction being carried out in the presence of hydrogen at a temperature of 190° C. Good results may also be obtained by using kieselguhr catalysts which are obtained by reduction of a kieselguhr carrier containing 30% by weight of nickel oxides, 2% by weight of cupric ions and 3.3% by weight of sulfate ions, the percentages again referring to the whole of the system, i.e. carriers and material to be admixed, and the reduction being carried out in the presence of hydrogen at a temperature of 190–200° C.

If, after a comparatively long time of operation, the catalysts, owing to damages of the surface, lose some of their activity they may be subjected to a regeneration or a roasting process whereby their initial activity will be restored. The oxidation or roasting is effected by means of gases containing oxygen such as air. This process is followed by a flush cleaning with nitrogen and a partial reduction with hydrogen carried out at a temperature between 180 and 200° C. A regeneration as has been described in the preceding paragraph is only seldom necessary for the catalysts proposed by the present invention. When operating according to the process of this invention it is, for example, possible to obtain, after a period of continuous operation of more than a year, a yield which is just as great as that obtained in the beginning of this process.

Hydrogenation is preferably carried out under normal pressure. It is, however, also possible to operate under an excess pressure of up to 10 atmospheres gauge. The contact load amounts to 100 to 200 grams of crotonaldehyde per hour and per litre of contact. The process may also be carried out in a continuous manner, the crotonaldehyde separated from butyraldehyde in the course of the distillation being reconveyed continuously into the reaction chamber.

The following examples serve to illustrate the invention but they are not intended to limit it thereto.

Example 1

1 litre of a nickel oxide catalyst containing 15% of nickel oxides, 2% cupric-ions and 3% of a sulfate residue and prepared by applying an aqueous suspension of nickel oxides containing 2 grams of copper sulfate to pumice (containing 15% of nickel oxides) is reduced with hydrogen at a temperature of 190° C. 130 cc. of crotonaldehyde (having a concentration of 90%) are applied per hour, 100 liters of hydrogen are circulated per hour and the operation temperature is 200° C.; the catalyst yields a mixture consisting of 84.3% of butyraldehyde, 5.4% of crotonaldehyde, the rest being water. Butyraldehyde can be quantitatively separated by distillation.

Example 2

A nickel oxide-kieselguhr catalyst is used containing 30% of nickel oxides, 2% of cupric ions and 3.3% of a sulfate residue; the catalyst is obtained as follows: nickel oxide-kieselguhr and a small amount of copper sulfate are kneaded to give a paste; the paste is shaped and the resulting catalyst is reduced at 190 to 200° C. 150 cc. of crotonaldehyde of 90% strength are applied per hour, about 100 litres of hydrogen are circulated per hour and the operating temperature is 195° C.; the catalyst yields a mixture consisting of 86.5% of butyraldehyde, 3% of crotonaldehyde and 10% of water. The separation of crotonaldehyde is effected by distillation in quantitative yield.

I claim:

1. In a process for preparing butyraldehyde, which process comprises subjecting crotonaldehyde to hydrogenation at a temperature in the range between 160° and 250° C. in the presence of a catalyst prepared by reducing nickel oxides, applied to a carrier material selected from the group consisting of pumice grains, ceramic materials, kieselguhr, silica gel and pumice powder, the improvement which comprises adding to the nickel oxides to be reduced copper sulfate in an amount which corresponds to 0.5 to 5 percent by weight based on the weight of nickel oxides and carrier.

2. A process as in claim 1 in which the molar proportion of crotonaldehyde to hydrogen is about 1:1, and said catalyst is reduced at a temperature between 160° and 250° C.

3. In a process for preparing butyraldehyde, which process comprises subjecting crotonaldehyde to hydrogenation at a temperature between 160° and 250° C. in the presence of a catalyst prepared by reducing, at a temperature of about 190° C., a mixture of 15 percent by weight of nickel oxides on a pumice, the improvement which comprises adding to the nickel oxides to be reduced 2 percent by weight cupric ions and 3 percent by weight of sulfate ions, said percentages being based on the total quantity of pumice plus nickel oxides and copper sulfate.

4. In a process for preparing butyraldehyde, which process comprises subjecting crotonaldehyde to hydrogenation at a temperature between 160° and 250° C. in the presence of a catalyst prepared by reducing, at a temperature of about 190° C., a mixture of 30 percent by weight of nickel oxides on a kieselguhr, the improvement which comprises adding to the nickel oxides to be reduced 2 percent by weight cupric ions and 3.3 percent by weight of sulfate ions, said percentages being based on the total quantity of kieselguhr plus nickel oxides and copper sulfate.

References Cited in the file of this patent

UNITED STATES PATENTS

| | | |
|---|---|---|
| 1,730,587 | Mugdan et al. | Oct. 8, 1929 |
| 2,658,921 | Alheritiere | Nov. 10, 1953 |

FOREIGN PATENTS

| | | |
|---|---|---|
| 478,386 | Great Britain | Jan. 18, 1938 |
| 478,487 | Great Britain | Jan. 19, 1938 |
| 649,554 | Great Britain | Jan. 31, 1951 |
| 677,091 | Great Britain | Aug. 6, 1952 |
| 495,714 | Canada | Sept. 1, 1953 |
| 539,177 | Germany | Nov. 12, 1931 |

OTHER REFERENCES

Horn: German application Ser. No. F 8772, printed April 5, 1956 (IV b/12o), 3 pgs. spec.